(12) United States Patent
Lappalainen et al.

(10) Patent No.: US 11,597,633 B2
(45) Date of Patent: Mar. 7, 2023

(54) ELEVATOR SAFETY BRAKE, ELEVATOR AND METHOD FOR TESTING ELEVATOR SAFETY BRAKES

(71) Applicant: KONE Corporation, Helsinki (FI)

(72) Inventors: Joni Lappalainen, Helsinki (FI); Henri Wenlin, Helsinki (FI); Antti Saarelainen, Helsinki (FI); Petri Alkula, Helsinki (FI); Lasse Hurri, Helsinki (FI); Andrej Burakov, Helsinki (FI); Leena Ranta, Helsinki (FI)

(73) Assignee: KONE CORPORATION, Helsinki (FI)

( * ) Notice: Subject to any disclaimer, the term of this patent is extended or adjusted under 35 U.S.C. 154(b) by 638 days.

(21) Appl. No.: 16/547,311

(22) Filed: Aug. 21, 2019

(65) Prior Publication Data

US 2020/0062545 A1     Feb. 27, 2020

(30) Foreign Application Priority Data

Aug. 22, 2018  (WO) .................. PCT/FI2018/050596
Aug. 22, 2018  (WO) .................. PCT/FI2018/050597
Feb. 4, 2019   (EP) ..................... 19155229

(51) Int. Cl.
*B66B 5/20*   (2006.01)
*B66B 1/32*   (2006.01)
(Continued)

(52) U.S. Cl.
CPC .................. *B66B 5/20* (2013.01); *B66B 1/32* (2013.01); *B66B 5/0093* (2013.01); *G01L 5/28* (2013.01)

(58) Field of Classification Search
CPC ............ B66B 5/20; B66B 1/32; B66B 5/0093
See application file for complete search history.

(56) References Cited

U.S. PATENT DOCUMENTS 2,914,138 A * 11/1959 Borden ..................... B66B 1/32
                                                       188/171
7,591,351 B2 *  9/2009 Fischer .................... B66D 5/14
                                                       188/164
(Continued)

FOREIGN PATENT DOCUMENTS

CN     201309813 Y    9/2009
CN     103527685 A    1/2014
(Continued)

OTHER PUBLICATIONS

Machine Translation of WO 2007/023550.*
(Continued)

*Primary Examiner* — Diem M Tran
(74) *Attorney, Agent, or Firm* — Birch, Stewart, Kolasch & Birch, LLP

(57) ABSTRACT

An elevator safety brake unit, an elevator including at least two of the safety brake units, and a method for testing the safety brake units are disclosed. Each safety brake unit includes a frame part, a movable composition movably supported on the frame part, a compression spring assembly associated with the movable composition, and adapted to activate a braking by pushing the movable composition forward, and a coil assembly of an electromagnet disposed in the frame part and adapted to deactivate the braking by pulling the movable composition backwards. Each movable composition includes at least two movable elements, one compression spring for each movable element, and at least one coil assembly adapted to deactivate the braking by pulling the at least two movable elements backwards.

19 Claims, 5 Drawing Sheets

Figure 1:
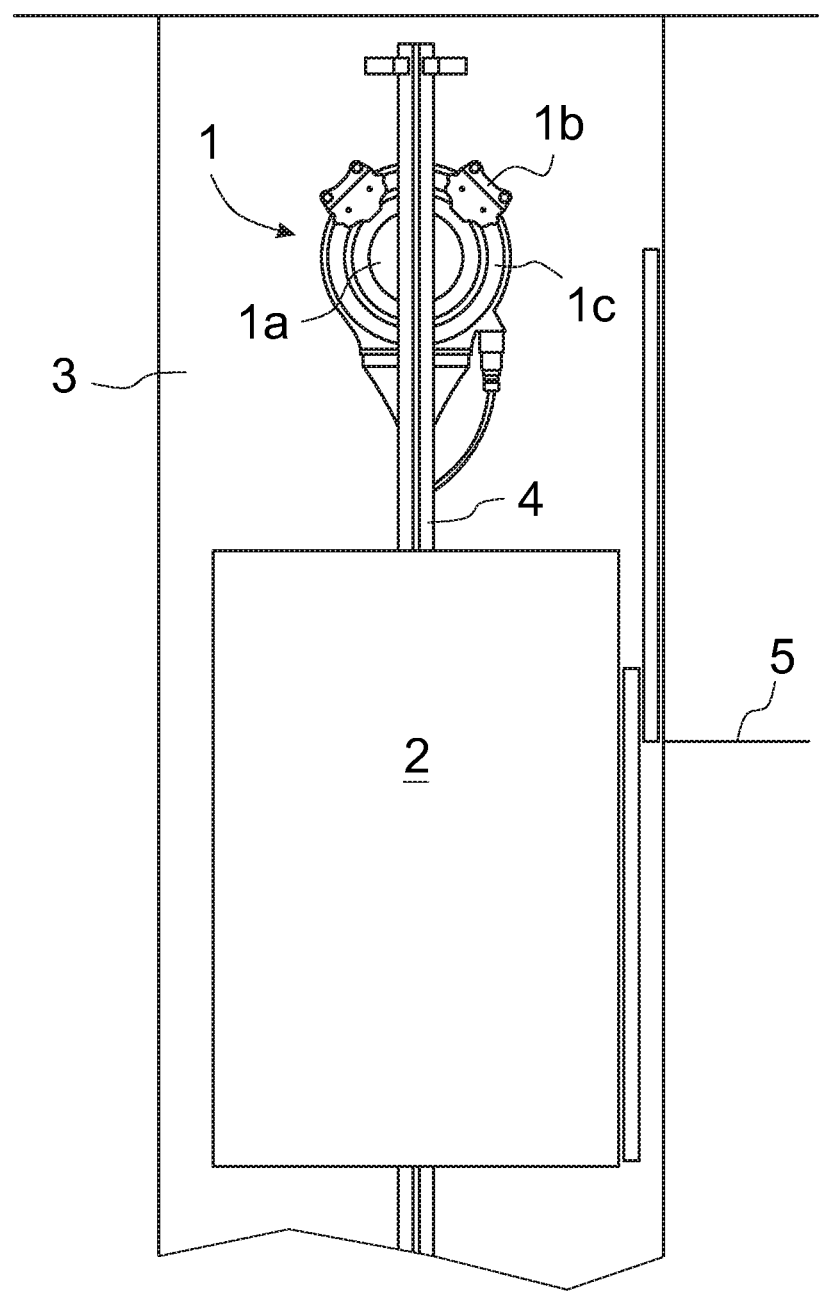

(51) Int. Cl.
  *G01L 5/28* (2006.01)
  *B66B 5/00* (2006.01)

(56) References Cited

U.S. PATENT DOCUMENTS

| | | | | |
|---|---|---|---|---|
| 9,046,142 B2 * | 6/2015 | Kattainen | ............... | H02P 15/00 |
| 2005/0087407 A1 | 4/2005 | Fischer | | |
| 2013/0299281 A1 * | 11/2013 | Lahteenmaki | ............ | B66B 5/00 188/79.51 |
| 2014/0291075 A1 * | 10/2014 | Vlasov | ..................... | B66D 5/08 188/74 |
| 2015/0114762 A1 * | 4/2015 | Olkkonen | ............... | B66D 5/08 187/250 |

FOREIGN PATENT DOCUMENTS

| | | |
|---|---|---|
| EP | 1 411 018 A2 | 4/2004 |
| EP | 1 701 904 B1 | 11/2011 |
| JP | 2006-052035 A | 2/2006 |
| JP | 2006-335547 A | 12/2006 |
| KR | 10-2017-0050466 A | 5/2017 |
| WO | WO 00/20320 A1 | 4/2000 |
| WO | WO-2007023550 A1 * 3/2007 ............... B66B 1/32 |
| WO | WO-2014086669 A1 * 6/2014 ............... B66B 1/32 |

OTHER PUBLICATIONS

International Search Report for PCT/FI2018/050596 (PCT/ISA/210) dated Feb. 27, 2019.
International Search Report for PCT/FI2018/050597 (PCT/ISA/210) dated Mar. 1, 2019.
Written Opinion of the International Searching Authority for PCT/FI2018/050596 (PCT/ISA/237) dated Feb. 27, 2019.
Written Opinion of the International Searching Authority for PCT/FI2018/050597 (PCT/ISA/237) dated Mar. 1, 2019.

* cited by examiner

ELEVATOR SAFETY BRAKE, ELEVATOR AND METHOD FOR TESTING ELEVATOR SAFETY BRAKES

FIELD OF THE INVENTION

The present invention relates to an elevator safety brake as defined in the preamble of claim 1, an elevator as defined in the preamble of claim 8 and a method for testing elevator safety brakes as defined in the preamble of claim 11.

BACKGROUND OF THE INVENTION

Elevators are commonly used to carry people up and down in buildings. The passenger safety in elevators is one of the most important aspects. It must be controlled that the elevator car cannot fall freely downwards or move uncontrolled upwards. Also, all accelerations and decelerations must be kept in certain safe limits. And further, an elevator car must stop substantially smoothly in a correct place at the floor where it is landing. Additionally, the elevator car must be able to leave the floor substantially smoothly. In addition, the elevator car must stay in its position in a floor also in overload situations.

For the reasons mentioned above the authorities in different countries have drafted various regulations related to elevator safety issues. The basic principle is that the brake arrangement of an elevator must be able to stop the elevator car from its nominal speed and keep the elevator car in its position in a floor also in overload situations. In addition, the brake arrangement must be fault tolerant so that one mechanical fault is not able to make the brake arrangement totally inoperative.

Among other things, some safety regulations request that the elevator brake must be mechanically doubled so if one part of the brake failures another part of the brake still works properly. Mechanically doubled elevator brakes are used in normal operation so that both the brakes are always used at the same time. A problem with this kind of a use is that a mechanical failure of one of the brakes in the pair is not necessarily discovered. In that case the elevator may operate a long time hinging on one brake only. This may cause surprisingly dangerous situations.

Some other safety regulations request that the elevator must have one driving machine brake or operating brake and one emergency brake. In some solutions safety brakes, operating in contact with elevator guide rails, act as emergency brakes. If the driving machine operating brake failures the safety brake has to stop the elevator car within a predetermined displacement so that an uncontrolled acceleration of the elevator car will not arise. A problem with these solutions is that the emergency brake is activated only when a considerable speed or acceleration has already been achieved and a dangerous situation has grown up. The emergency brake can prevent fatal injuries of the passengers, but it is not able to prevent down fallings and/or all nonfatal injuries.

Traction sheave elevators have a hoisting machinery with a traction sheave to move the elevator car up and down in an elevator shaft. Due to the safety regulations mentioned above the hoisting machinery usually comprise one or more electromechanical brakes to be used as safety devices. Preferably, the brakes are arranged to apply braking force to the rotating traction sheave or its rotating axis to decelerate and/or stop the motion of the elevator car. Usually there are two separate brakes, which must be dimensioned to stop and hold the elevator car with 125% load at standstill in the elevator shaft. This means that the brakes must handle an overload of 25%.

Further, the same brakes are also used in rescue situations and also in emergency braking situations to stop the elevator car if an operational fault occurs. A typical example of that kind of operational fault is an over speed of the elevator car.

Still further, the same brakes are used to protect elevator passengers from unintended car movement at the landing and to provide safe operating environment for the servicemen inside the elevator shaft. Therefore, it is necessary to ensure that the brakes are operating correctly. That is done by testing the operating condition of the brakes. An advantageous method for testing the operating condition of the elevator operational brakes is presented in the European patent publication No. EP1701904B1.

OBJECT OF THE INVENTION

One object of the present invention is to eliminate drawbacks of prior art technology and to achieve an elevator with safety brakes where the operation condition testing of the safety brakes is fast and easy to perform. Another object of the present invention is to achieve an elevator having higher ride comfort due to a decreased deceleration fluctuation as well as quieter braking operations. Yet another object of the present invention is to achieve an elevator having smaller and more cost-effective brake units than in prior art technology. The elevator safety brake according to the invention is characterized by what is disclosed in the characterization part of claim 1. Other embodiments of the invention are characterized by what is disclosed in the other claims.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise, the different details presented in connection with each embodiment can also be applied in other embodiments. In addition, it can be stated that at least some of the subordinate claims can, in at least some situations, be deemed to be inventive in their own right.

BRIEF DESCRIPTION OF THE INVENTION

This invention discloses a new kind of elevator safety brake, an elevator where said elevator safety brake is used, and a motor-assisted test method of said safety brake. The safety brake, in the form of a disc brake, has been disclosed in more detail in earlier patent applications No. PCT/FI2018/050596 and PCT/FI2018/050597, which may disclose a part of this invention. However, the same basic principle, e.g. a brake unit with at least two spring-actuated armatures in a common brake unit frame containing a single electromagnet, is applicable to shoe brakes or drum brakes, as well.

An aspect of the invention is to provide an elevator safety brake unit having a frame part, a movable composition movably supported on said frame part, a compression spring assembly or corresponding associated with said movable composition, and adapted to activate a braking by pushing said movable composition forward, and a coil assembly of an electromagnet disposed in said frame part and adapted to deactivate the braking by pulling said movable composition backwards. Advantageously, each movable composition comprises at least two movable elements, such as brake plates in case of a disc brake and armatures in case of a drum brake, one compression spring or corresponding for each movable element, and at least one coil assembly adapted to deactivate the braking by pulling said at least two movable elements backwards.

Preferably, each brake unit comprises N movable elements and N compression springs, where N is an integer greater than one.

According to an embodiment, the coil assembly has only one coil, wherein said coil is common for the at least two movable elements.

Another aspect of the invention is to provide an elevator comprising an elevator car movable up and down along guide rails in an elevator shaft by a driving machinery, which comprises a drive motor, a traction sheave, and a brake assembly to stop the rotational motion of the traction sheave. Advantageously, the brake assembly comprises at least two safety brake units mentioned above, which safety brake units are operatively associated with the drive motor.

Yet a further aspect of the invention is to provide a method for testing safety brakes in the elevator mentioned above.

In the elevator each safety brake unit comprises N movable elements, where value of N being an integer greater than one.

The test method comprises:
a) actuating less than N, preferably N−1 movable elements of a first safety brake unit and providing, with a drive motor, a test torque to test the actuated movable elements of the first safety brake unit. The N−1 movable elements are e.g. a subset of N.

At phase a), actuating simultaneously all N movable elements of another safety brake unit.

Preferably before phase a) above, actuating all movable elements of the other safety brake units while keeping all movable elements of a first safety brake unit open, and providing, with a drive motor, a test torque to test the actuated movable elements of the other safety brake units.

After phase a), repeating the test symmetrically to all the safety brake units.

One significant advantage of the invention is that the operation condition testing of the safety brakes is fast, cost effecting and easy to perform. Another advantage is that the safety brake units can be small in their size and cost effective. The dimensioning of the brake units becomes smaller when the number of brake plates or armatures increases. This means that the brake unit is cheaper to manufacture and it fits into a smaller space. In addition, the braking torque is not too high, which might otherwise cause an uncomfortably high deceleration for elevator passengers in some emergency stop situations. Yet another advantage is higher ride comfort due to decreased deceleration fluctuation as well as a quieter operation of the brakes. Further, thanks to at least two brake units with two or more movable brake elements like brake plates with brake pads or armatures with brake bands or linings a failure of a brake part decreases the usable braking torque only a little, and the brake arrangement remains operable. Yet a further advantage of the inventive test method according to the invention is that the mechanical brakes unit may be used as safety brakes, because the reliability of the brakes can be verified and certified with in-use tests according to elevator regulations.

LIST OF FIGURES

Figure 2:
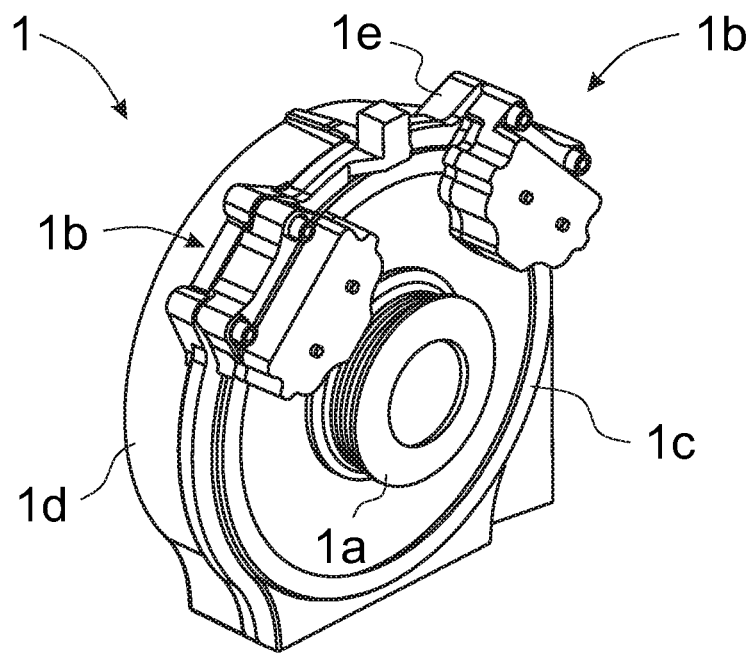
Figure 3:
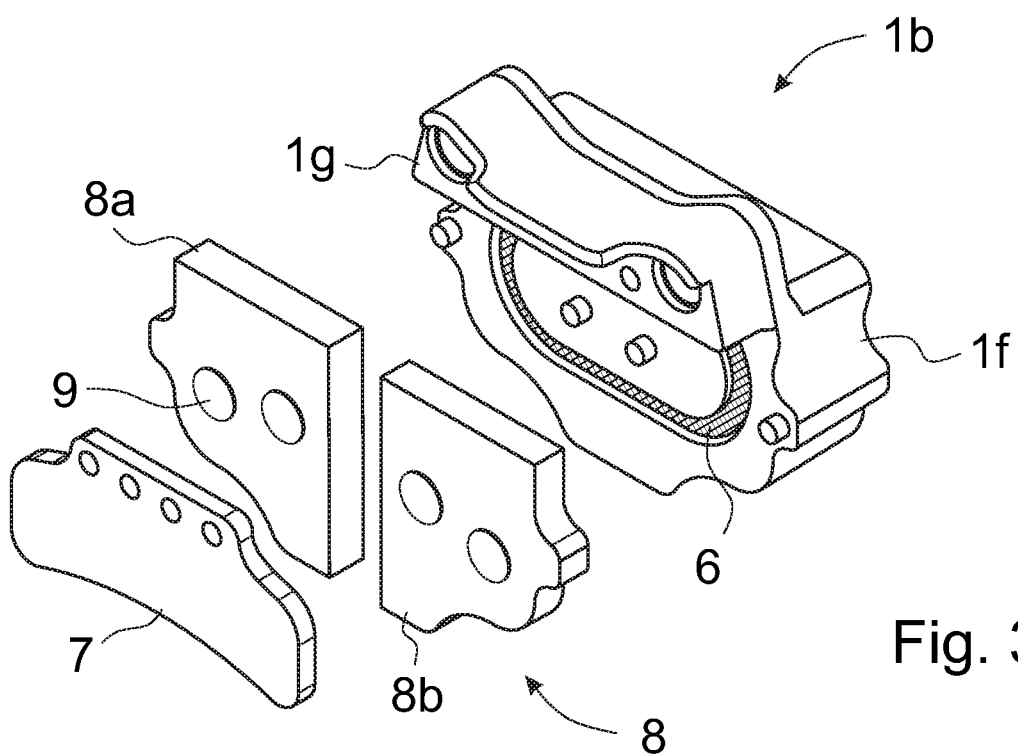
Figure 4:
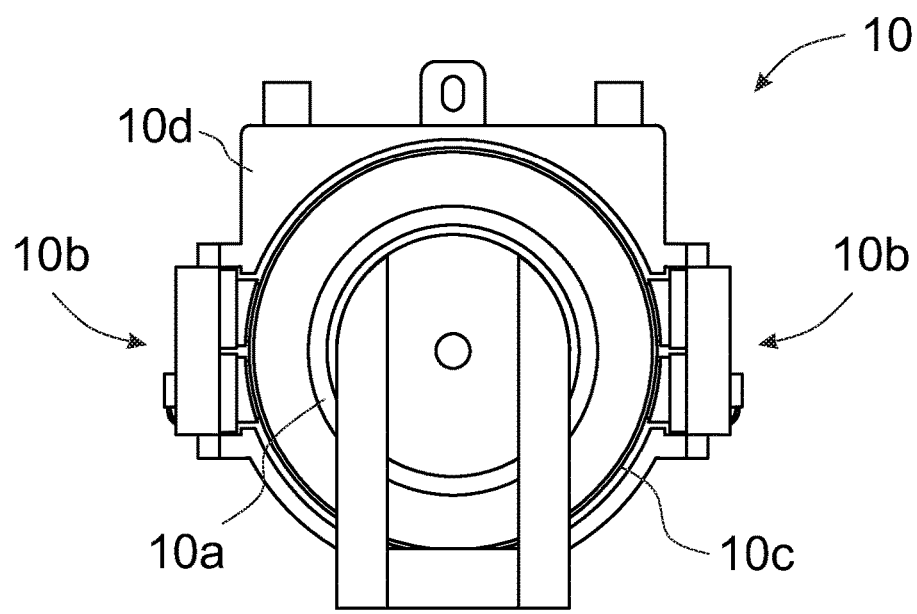
Figures 5, 6:
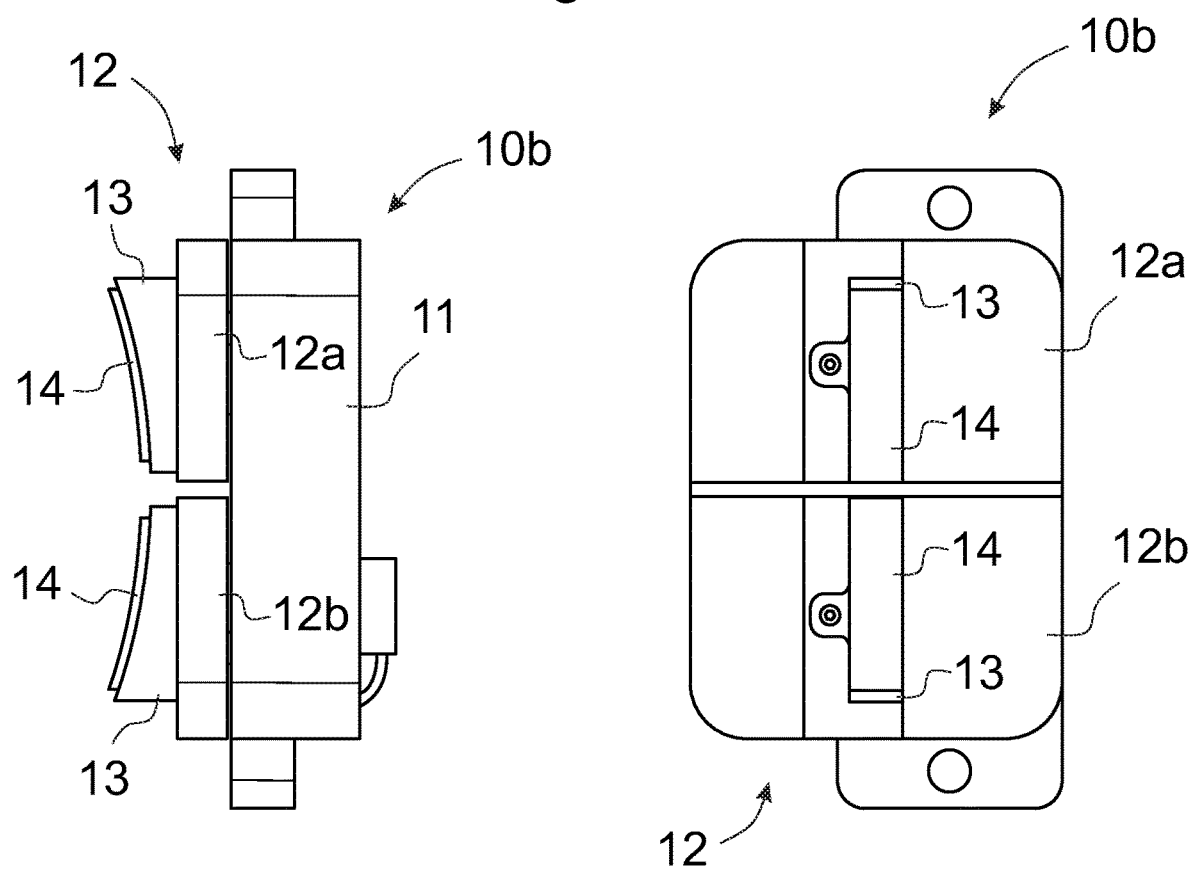
Figure 7:
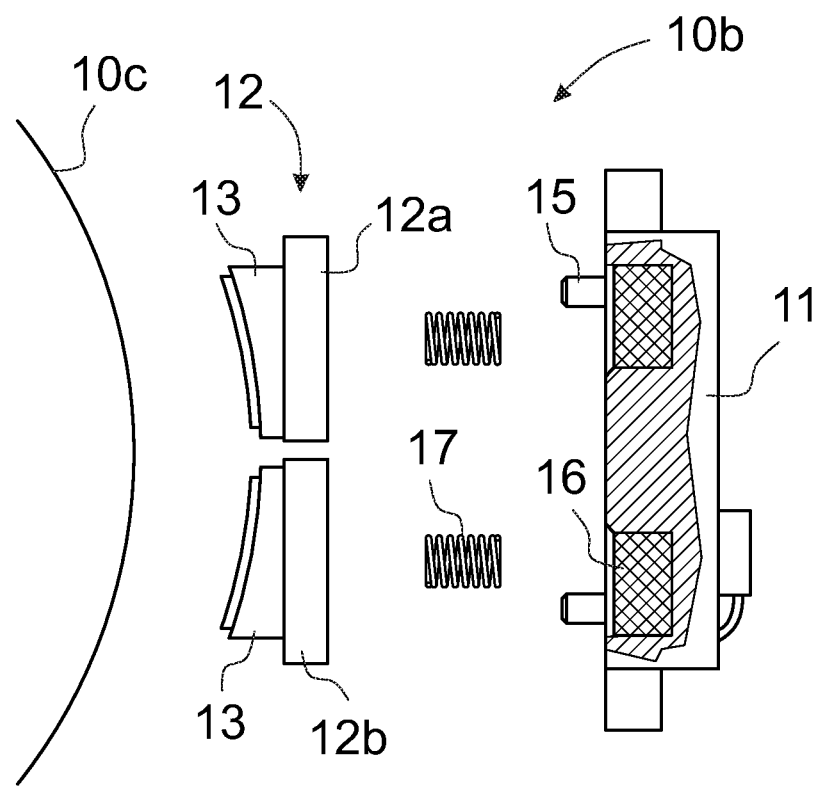
Figure 8:
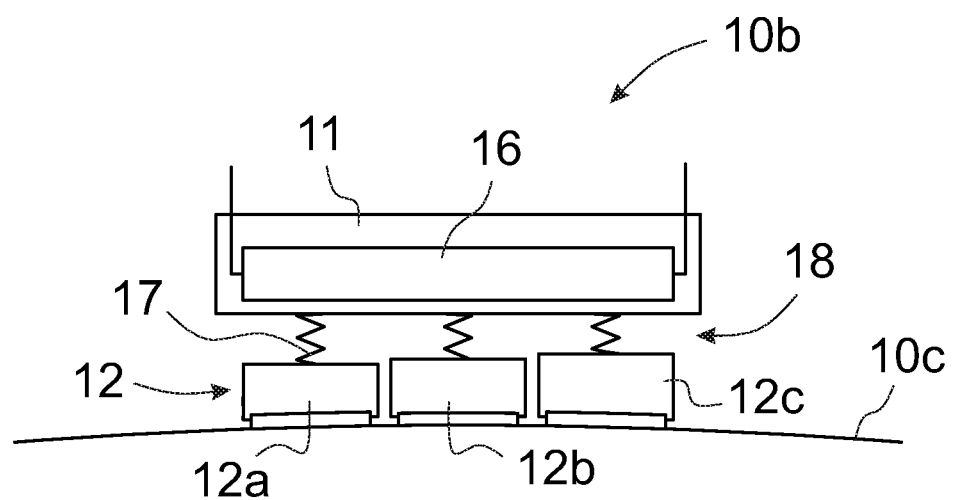
Figure 9:
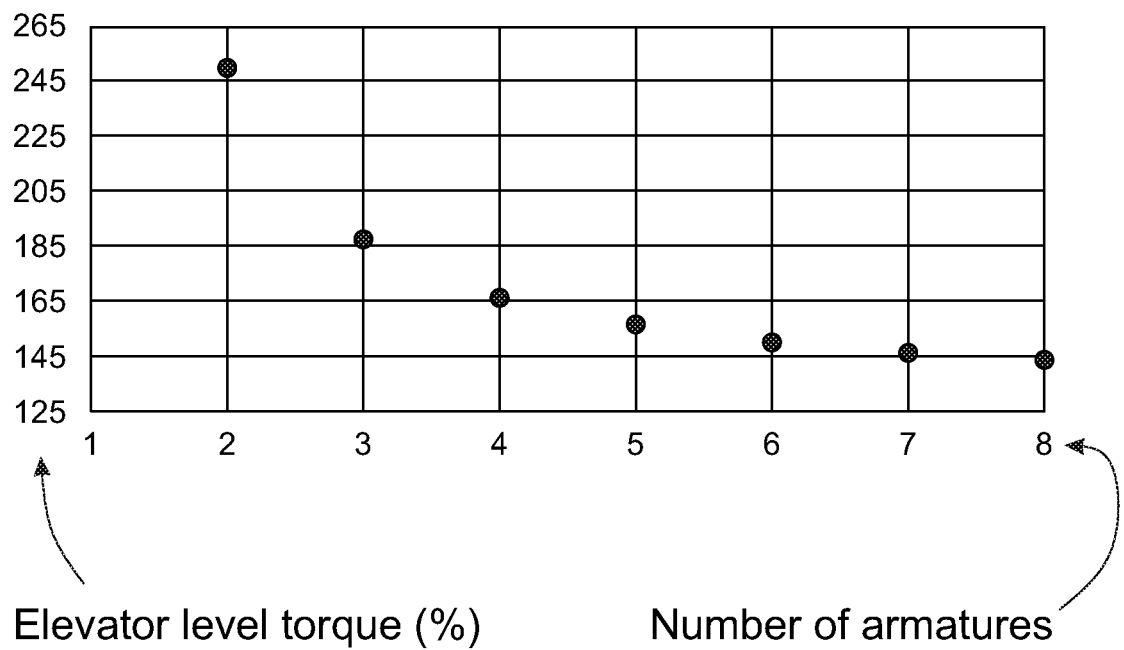

In the following, the invention will be described in detail by the aid of example embodiments by referring to the attached simplified and diagrammatic drawings, wherein FIG. 1 presents in a simplified and diagrammatic side view an upper end of an elevator shaft with an elevator machinery according to the invention, and an elevator car approaching the uppermost floor level, FIG. 2 presents in a simplified and diagrammatic oblique top view an elevator machinery with two driving machinery safety brake units according to the invention, FIG. 3 presents in a simplified and diagrammatic oblique top view the driving machinery safety brake unit presented in FIG. 2 as an exploded view with only main components shown, FIG. 4 presents in a simplified and diagrammatic front view an elevator machinery according to the invention with another type of driving machinery safety brake units according to the invention, FIG. 5 presents in a simplified and diagrammatic side view a safety brake unit of the elevator machinery presented in FIG. 4, FIG. 6 presents in a simplified and diagrammatic front view the safety brake unit presented in FIG. 5, FIG. 7 presents in a simplified and diagrammatic side view the safety brake unit with two braking elements presented in FIG. 4 as an exploded and partially cross sectioned view with only main components shown, FIG. 8 presents in a simplified and diagrammatic side view another embodiment of a driving machinery safety brake unit according to the invention comprising three armatures with different sizes, and FIG. 9 presents in a form of a chart effects to the total torque of an elevator when increasing number of armatures in elevator brakes.

DETAILED DESCRIPTION OF THE INVENTION

FIG. 1 presents in a simplified and diagrammatic side view a part of the building where a sidewall of an elevator shaft 3 is removed, and an elevator car 2 is approaching the uppermost floor level 5. An elevator driving machinery 1 with a traction sheave 1a, two operating safety brake units 1b and a brake disc 1c is preferably fastened to a guide rail 4 at the upper end of the elevator shaft 5. In this embodiment of the invention the safety brake units 1b are disc brakes.

The elevator is a so-called Machine-Room-Less (MRL) elevator where the elevator driving machinery 1 with its operating brake units 1b and traction sheave 1a is in the elevator shaft 3 or in an appropriate space adjacent to the elevator shaft 3, and preferably in the upper area of the elevator shaft, advantageously just below the ceiling of the elevator shaft 3. The elevator car 2 is arranged to run up and down in the elevator shaft 3 along guide rails 3 guided by guide shoes. In addition, the elevator comprises a counterweight or balance weight that is also arranged to run up and down in the elevator shaft 3 along its own guide rails. The counterweight and its guide rails are not presented in FIG. 1 for the sake of clarity.

The elevator car 2 and the counterweight are connected to each other with elevator ropes or hoisting ropes that also are not presented in FIG. 1 for the sake of clarity. The cross section of the hoisting ropes can preferably be round or as a flat rectangle.

FIG. 2 presents in a simplified and diagrammatic oblique top view an elevator driving machinery 1 with two driving machinery safety brake units 1b according to the invention. The driving machinery safety brake units 1b can also be called operational safety brakes 1b. Later in this context they are called in a shorter way only safety brakes units 1b.

The elevator driving machinery 1 comprises at least a housing 1d, a drive motor, a traction sheave 1a, a brake assembly having preferably at least two safety brake units 1b that are disc brake units in the embodiment and a brake disc 1c. The drive motor is inside the machinery housing 1d and is arranged to rotate simultaneously the coaxial traction sheave 1a and brake disc 1c. The safety brake units 1b are fastened floatably to fastening lugs 1e on the outer periphery of the housing 1d. The safety brake units 2 have been arranged to decelerate and stop the rotational movement of the brake disc 1c and at the same time also the rotational movement of the traction sheave 1a. In case of disc brakes the safety brake units 1b can also be called brake calipers.

A disc brake type safety brake unit 1b according to the invention is advantageously used as an elevator driving machine brake unit to decelerate and stop movements of the elevator car 2 and/or to keep the elevator car 2 in its position during loading and unloading phases and also when being out of use.

The invention relates to an elevator disc brake assembly with at least two safety brake units 1b each having at least two brake plates. Advantageously each safety brake unit 1b comprises means or monitoring arrangement for monitoring operation states of their both brake plates. In the elevator disc brake assembly, the required states of the brake plates of the two-plate brake units 1b are monitored with the monitoring arrangement comprising at least a state indicator assembly that preferably comprises a monitoring/measuring sensor. The purpose of the monitoring is to secure the reliable operation of the safety brake units 1b by checking if both the brake plates of the safety brake units 1b are working properly, abnormally or if they do not work at all.

FIG. 3 presents in a simplified and diagrammatic oblique top view the safety brake unit 1b presented in FIG. 2 as an exploded view with only main components shown. Among other things each safety brake unit 1b comprises a body or frame part 1f, a top element 1g, a counter element 7 and a brake plate assembly 8 having two separate brake plates 8a, 8b. The counter element 7 can be also called a caliper plate.

The frame part 1f forms a hollow housing inside, which a compression spring assembly for pressing the brake plates 8a, 8b towards the counter element 7 and brake disc 1c is placed. Advantageously, the spring assembly comprises separate spring actuators for each brake plate 8a, 8b. Each spring actuator may comprise one or more springs. Preferably, the springs are compression springs. That kind of brake structure is safe because in case of electric failure the springs of the spring assembly press mechanically the brake plates 8a, 8b towards the brake disc 1c and the rotation of the traction sheave 1a and also the vertical movement of the elevator car 2 is stopped in a safe way. For the sake of clarity, the spring assembly is not presented in FIG. 3.

Also, an electromagnet arrangement comprising a coil assembly 6 causing a magnetic force for pulling the brake plates 8a, 8b free from the brake disc 1c when the brake is opened is placed inside the frame part 1f. The coil assembly 6 comprises at least one coil.

The disc type safety brake assembly according to the invention is arranged to operate so that when the electromagnet arrangement comprising the coil assembly 6 is powered the brake plates 8a, 8b are pulled against the frame part 1f of the safety brake unit 1b free from the brake disc 1c. In that case the brake is open and the brake disc 1c and the traction sheave 1a can be rotated. The brake is activated or closed by switching the power off from the electromagnet arrangement. In the power off situation the springs of the spring assembly press the brake plates 8a, 8b against the brake disc is that cannot be rotated any more.

For the sake of clarity, the brake plates 8a, 8b in FIG. 3 are slightly separated from each other. The brake plates 8a, 8b are substantially flat plates comprising a group of friction pads or linings 9 on the surface that is facing to the rotating brake disc 1c.

The counter element 7 also comprises friction pads or linings on its surface that is facing to the rotating brake disc 1c. Preferably those pads or linings are substantially similar to the pads or linings 9 of the brake plates 8a, 8b.

Advantageously, the size and shape of the brake plates 8a, 8b are substantially equal but the thickness is different so that, for example, the first brake plate 8a is thicker than the second brake plate 8b. For that reason, the horizontal gap between the braking surface of the first brake plate 8a and the braking surface of the brake disc 1c is smaller than the corresponding gap between the braking surface of the second brake plate 8b and the braking surface of the brake disc 1c. That feature makes the sequential brake arrangement possible. Due to the smaller gap the first brake plate 8a hits the brake disc 1c slightly earlier than the second brake plate 8b when a braking is actuated and the brake is closed by the spring assembly after the magnetic force provided by the coil assembly 6 is weakened or removed. This braking arrangement gives a higher ride comfort due to decreased deceleration fluctuation, as well as a quieter operation because there are only two minor clicks instead of one louder slam.

Above is mentioned that the brake plates 8a, 8b in each disc type safety brake unit 1b are otherwise similar but preferably their thickness is unequal. Thus, there may be a brake plate assembly 8 comprising altogether four brake plates with four diverse thicknesses, or two brake plates with a first thickness and the other two brake plates with a second thickness. So, in the first case all the brake plates 8 are unequal in their thickness. Thus, they all can be pressed against the braking surface of the brake disc 1c at slightly diverse time, one after the other.

The electromagnet arrangement of the safety brake unit 1b is placed inside the frame part 1f. In this embodiment the frame part 1f comprises the coil assembly 6 with only one coil that is common for both the brake plates 8a, 8b. Therefore, the coil extends, preferably symmetrically, to the area of each brake plate 8a, 8b and is arranged to interact in the same way with both the brake plates 8a, 8b.

In another advantageous embodiment according to the invention the coil assembly 6 may comprise a separate coil for each brake plate 8a, 8b. Preferably in that kind of embodiment the brake assembly comprises adjusting means for adjusting each brake plate 8a, 8b separately. Thus, the first brake plate 8a is interacted by the first coil and the second brake plate 8b is interacted by the second coil. In that embodiment the operation of the two brake plates 8a, 8b can be freely adjusted.

In general, it is characteristic to the assembly according to the invention that it has at least two separate safety brake units 1b, each brake unit 1b comprising at least two separate brake plates 8a, 8b that are placed sequentially in the direction of rotation of the brake disc 1c.

FIG. 4 presents in a simplified and diagrammatic front view an elevator machinery 10 according to the invention with another type of driving machinery safety brake units 10b according to the invention. The safety brake units 10b of the brake assembly of this embodiment are operationally fastened to the frame 10d of the elevator machinery 10. Instead of a brake disc and disc type safety brake units the elevator machinery 10 now comprises a brake drum 10c and two shoe type safety brake units 10b arranged to stop the rotational motion of the brake drum 10c and at the same time the rotational motion of the traction sheave 10a that is on the same rotation axis as the brake drum 10c.

FIGS. 5-7 present in simplified and diagrammatic views a safety brake unit 10b presented in FIG. 4. FIG. 5 presents the safety brake unit 10b in a side view and FIG. 6 presents the same safety brake unit 10b in a front view. Further, FIG. 7 presents the same safety brake unit 10b as exploded and in a partially cross-sectioned side view, and with only main components shown.

The safety brake unit 10b comprises a frame part 11, which further comprises at least one coil assembly 16 to form an electromagnet inside the frame part 11. Also, other necessary electric and electronic components are placed in the connection of the frame part 11. The safety brake unit 10b is fastened to the frame 10d of the elevator machinery 10 through the frame part 11.

Preferably the safety brake unit 10b comprises at least two separate armatures 12, a first armature 12a and a second armature 12b each having a braking element 13 equipped with a braking surface 14 that is arranged to be pressed against the braking surface of the brake drum 10c.

The safety brake unit 10b further comprises a spring assembly with compression springs 17 that are placed between the frame part 11 and the armatures 12 to press the braking elements 13 towards the brake drum 10c when the power from coil assembly 16 of the electromagnet is switched off. The efficiency of the coil assembly 16 has been dimensioned so that it is capable of pulling the braking surfaces 14 of the braking elements 13 free from the brake drum 10c and keep them on the loose when the electric power has been switched on to the coil assembly 16. At another time the compression springs 17 keep the braking elements 13 pressed against the brake drum 10c so that the traction sheave 10a cannot rotate.

In addition, the safety brake unit 10b comprises guiding elements 15 to guide the linear back and forth motion of the armatures 12.

FIG. 8 presents in a simplified and diagrammatic side view another embodiment of a driving machinery safety brake unit 10b according to the invention. In this embodiment the safety brake unit 10b comprises three armatures 12, a first armature 12a, a second armature 12b and a third armature 12c.

Preferably, the linear back and forth motion of the armatures 12a-12c is arranged so that the traveling length of the first armature 12a is the longest, the traveling length of the second armature 12b is the second longest and the traveling length of the third armature 12c is the shortest. Advantageously, this is arranged so that the armatures 12a-12c are different in their sizes so that in their direction of movement the dimension of the first armature 12a is the shortest, the dimension of the second armature 12b is the second shortest, and the dimension of the third armature 12c is the longest. In that case a gap 18 or distance between the back surface of the armatures and the counter surface of the frame part 11 varies so that with the first armature 12a the distance is the longest and so on.

The dimension differences make also the gaps between the braking surfaces 14 of the armatures 12a-12c and the braking surface of the brake drum 10c different from each other. When the brake is open, i.e. it does not brake, the gap of the first armature 12a is the longest, the gap of the second armature 12b is the second longest and the gap of the third armature 12c is the shortest.

That feature makes the sequential brake arrangement possible when a braking is actuated and the brake is closed by the springs 17 after the magnetic force provided by the coil assembly 16 is weakened or removed. Due to the smaller gap the brake surface 14 of the first armature 12a hits the brake drum 10c slightly earlier than the brake surface 14 of the second armature 12b, which in its turn hits the brake drum 10c slightly earlier than the brake surface 14 of the third armature 12c. This braking arrangement gives a higher ride comfort due to decreased deceleration fluctuation, as well as a quieter operation because there are only three minor clicks instead of one louder slam.

The same kind of improvement in a ride comfort can also be arranged in the elevator driving machinery 10 where only two armatures 12 are used in the safety brake unit 10b, and even in the driving machinery with disc type safety brake units 1b as described above. In that case, for example, the thickness of the brake plates 8a, 8b is unequal. Also, instead of two or three the brake plates 8 or armatures 12 can be more, for instance four or more, and their dimensions in the direction of the linear back and forth motion can be unequal.

It is common to both the disc type safety brake unit 1b and to the drum type safety brake unit 10b according to the invention to have a frame part 1f, 11 that comprises a coil assembly 6, 16 for an electromagnet, and a movable composition having two or more movable elements like disc plates 8 or armatures 12 that are pushed by the compression springs 17 of the spring assembly outwards from the frame part 1f, 11 and pulled by the coil assembly 6, 16 towards the frame part 1f, 11.

The movable elements 8, 12 comprise braking surfaces 9, 14 to contact with the braking surface of the brake disc 1c or brake drum 10c. That kind of braking contact is also called an engagement in this document, and the disengagement in this document means the opposite or removing the braking contact between the braking surfaces 9, 14 of the movable elements 8, 12 and the braking surface of the brake disc 1c or brake drum 10c. Correspondingly the verb engage means achieving a braking contact and the verb disengage means the opposite or removing the braking contact.

More generally, each brake unit 1b, 10b may comprise N movable elements 8, 12 and N compression springs 17, where N is an integer greater than one.

The invention also relates to an elevator comprising an elevator car 2 that is movable up and down along guide rails 4 in an elevator shaft 3 by a driving machinery 1, 10, which comprises a drive motor, a traction sheave 1a, 10a, and a brake assembly to stop the rotational motion of the traction sheave 1a, 10a. Preferably, the brake assembly comprises at least two safety brake units 1b, 10b operatively associated with the drive motor. The structure and operation of the safety brake units 1b, 10b are described above.

The structure of the brake assembly may vary. For instance, the brake assembly may comprise disc type safety brake units 1b that are arranged to engage and disengage with a brake disc 1c rotated by the drive motor of the driving machinery 1, or the brake assembly may comprise drum type safety brake units 10b that are arranged to engage and disengage with a brake drum 10c rotated by the drive motor of the driving machinery 1. In the disc type safety brake units 1b the movable elements 8 are brake plates 8a, 8b. Whereas in the drum type safety brake units 10b the movable elements 12 are called armatures 12a-12c.

FIG. 9 presents in a form of a chart effects to the total torque of an elevator machinery brakes in the function of used brake armatures 12 when the number of brake armatures 12 are increased in elevator drum type safety brake units 10b.

The brake torque requirements of an elevator are set by a code as follows:

$$T_{Armature} > T_{Elevator}/(N-1), \text{ where}$$

$T_{Armature}$=Torque of a brake armature
$T_{Elevator}$=Minimum elevator level torque in case one armature has failed
N=Number of brake armatures in the machinery This means that the machinery brakes must produce at least the nominal torque, even if a single armature of a brake unit fails. Elevators according to prior art typically comprise only one armature for each brake. Thus, in a classical case for an elevator this means that if another brake unit fails a single brake unit must produce the elevator level requirement torque of 125%. In order to fulfill this requirement, the two brake units in total comprising, one armature each, must produce 250% elevator level torque when both the brake units are working properly. In that case either of the brake units may fail and still the requirement of 125% torque can be achieved.

It can be seen in the chart of FIG. 9 that the curve formed by the points representing the elevator level torque (in percentage) required is converging slowly towards the requirement of 125% torque with one failed armature when the number of armatures is increased. When one armature is in each of the two brake units the requirement is 250% torque, when eight armatures are used, for instance four armatures in each brake unit, the requirement is less than 145% torque. This means that the more armatures the smaller and lighter brake arrangement is possible.

The same regularity correspondingly applies to brake plates 8 of the disc type safety brake units 1b.

Further the invention also relates to a method for testing safety brakes in the elevator that comprises two or more safety brake units 1b, 10b according to the invention. For testing the brakes, the drive motor of the driving machinery 1 is used. The method comprises at least the steps A-E as follows:

A. Engaging the movable elements 8, 12 of the first safety brake unit 1b, 10b and the second safety brake unit 1b, 10b, and driving the drive motor to provide a first test torque.

According to the safety requirement if one brake is defective, the remaining braking torque must be 110% of the nominal torque. The torque can be calculated with an equation: T=110%*TN*N/(N-1), wherein T is a test torque, TN is a nominal torque of an elevator, corresponding to an empty elevator car with 50/50 balancing, and N is the total number of brake armatures of both safety brakes.

B. Engaging the movable elements 8, 12 of the first safety brake unit 1b, 10b, disengaging the movable elements 8, 12 of the second safety unit 1b, 10b, and driving the drive motor to provide a second test torque, which is lower than the first test torque.

In this step B at least 73% of the nominal torque is provided to the brakes to detect if there is rotational movement of the brake disc 1c or brake drum 10c. This means that with an empty elevator car 2 drive motor torque of −27% is provided.

C. Engaging all but one movable element 8, 12 of the second safety brake unit 1b, 10b. This means that one movable element 8 or 12 is blocked so that it cannot move and engage with the braking surface of the brake disc 1c or brake drum 10c. In addition, the movable elements 8, 12 of the first safety brake unit 1b, 10b are engaged, and the drive motor is driven with a third test torque to detect if there is rotational movement. In addition, the third test torque is higher than the second test torque but lower than the first test torque.

Preferably, during this step C the test torque is 110% when one movable element 8 or 12 is blocked.

D. Engaging the movable elements 8, 12 of the second safety brake unit 1b, 10b, disengaging the movable elements 8, 12 of the first safety brake unit 1b, 10b, and driving the drive motor to provide the second test torque, which is lower than the first test torque.

Also, in this step D at least 73% of the nominal torque is provided to the brakes to detect if there is rotational movement of the brake disc 1c or brake drum 10c. This means that with an empty elevator car 2 drive motor torque of −27% is provided.

E. Engaging all but one movable element 8, 12 of the first safety brake unit 1b, 10b. This means that one movable element 8 or 12 is blocked so that it cannot move and engage with the braking surface of the brake disc 1c or brake drum 10c. In addition, the movable elements 8, 12 of the second safety brake unit 1b, 10b are engaged, and the drive motor is driven with the third test torque to detect if there is rotational movement, wherein the third test torque is higher than the second test torque but lower than the first test torque.

Preferably, also during this step E the test torque is 110% when one movable element 8 or 12 is blocked.

In an advantageous method according to the invention the movable element 8, 12 that is blocked, i.e. not engaged, in phases C and E mentioned above, is varied in the subsequent tests such that variation of braking forces between different movable element 8, 12 are taken into consideration when evaluating test results.

If a rotational movement is detected during the test steps or test sequences A-E, the brake unit under the test is determined as defective and a corrective action is issued. Corrective actions are, for instance, an interruption of the elevator operation and/or a generation of a service request to provide maintenance for the defective brake unit.

The order of the steps or sequences A.-E. of the testing method mentioned above may also be different. For example, it may be preferably as follows: at first step B.—then engaging all but one movable element (step C.)—then engaging all movable elements (step A.)—then step D.—then step E. And then again step A. if required.

An advantageous method to perform the test in the elevator mentioned above is as follows:

In the elevator, comprising two safety brake units 1b, 10b of the driving machinery 1, each safety brake unit 1b, 10b comprises N movable elements 8, 12, where value of N is an integer greater than one.

The test method comprises:
  a) actuating less than N, preferably N−1 movable elements 8, 12 of a first safety brake unit 1b, 10b and providing, with a drive motor, a test torque to test the actuated movable elements 8, 12 of the first safety brake unit 1b, 10b. The N−1 movable elements 8, 12 are e.g. a subset of N.

At phase a), actuating simultaneously all N movable elements 8, 12 of the second safety brake unit 1b, 10b.

Preferably before phase a) above, actuating all movable elements 8, 12 of a second safety brake unit 1b, 10b while keeping all movable elements 8, 12 of a first safety brake unit 1b, 10b open, and providing, with a drive motor, a test torque to test the actuated movable elements 8, 12 of the second safety brake unit 1b, 10b.

After phase a), repeating the test symmetrically to both the safety brake units 1b, 10b.

In case the driving machinery 1 comprises more than two safety brake units 1b, 10b, an advantageous method for performing the test is to act in principle as above with two safety brake units 1b, 10b so that each safety brake unit 1b, 10b is tested one after the after in a normal way and after that each safety brake unit 1b, 10b is tested one after the after so that one movable element (8, 12) is disengaged.

Yet an advantageous and fast method to perform a brake test in the elevator mentioned above may also comprise steps as follows:

F. Engaging the movable elements 8, 12 of all the safety brake units 1b, 10b by controlling the electric current in the coil assembly 6, 16 of the electromagnet of the brake units 1b, 10b, and driving the drive motor to provide a first test torque.

In that case all the brake units 1b, 10b are activated to brake at a full power, and all the movable elements 8, 12 are pressed against the rotatable braking surface of the elevator driving machinery 1.

G. Disengaging the movable elements 8, 12 of the first safety brake unit 1b, 10b one after the other by increasing the electric current in the coil assembly 6, 16 of the electromagnet of the first brake unit 1b, 10b, and driving the drive motor after each disengagement to provide the following test torques.

In that case the movable elements 8, 12 of the first safety brake unit 1b, 10b are disengaged one after the other until all the movable elements 8, 12 of the first safety brake unit 1b, 10b are disengaged. This kind of sequential disengagement is made possible preferably by a hysteresis air gap between the braking surfaces of the movable elements 8, 12 and the braking surface of the brake disc between the rotatable braking surface of the elevator driving machinery 1.

H. Disengaging the movable elements 8, 12 of the second safety brake unit 1b, 10b one after the other by increasing the electric current in the coil assembly 6, 16 of the electromagnet of the second brake unit 1b, 10b, and driving the drive motor after each disengagement to provide the following test torques.

In that case the movable elements 8, 12 of the second safety brake unit 1b, 10b are disengaged one after the other until all the movable elements 8, 12 of the second safety brake unit 1b, 10b are disengaged. This kind of sequential disengagement is made possible preferably by a hysteresis air gap between the braking surfaces of the movable elements 8, 12 and the braking surface of the brake disc between the rotatable braking surface of the elevator driving machinery 1.

I. Repeat step H. for each safety brake unit 1b, 10b in the elevator driving machinery until all the safety brake units 1b, 10b have been tested.

The steps F. to I. may also be done so that instead of starting with a small current in the coil assembly 6, 16 of the electromagnets of the safety brake units 1b, 10b the high current is used. In that case the safety brake units 1b, 10b are released in the beginning of the test sequence and they are not braking. Now, the current in the first safety brake unit 1b, 10b is decreased little by little so that at first one movable element 8, 12 with the biggest hysteresis gap is pressed by the spring assembly of the first safety brake unit 1b, 10b against the rotatable braking surface of the elevator driving machinery 1. After that the drive motor is used to provide a first test torque.

The current in the first safety brake unit 1b, 10b is then decreased until all the movable elements 8, 12 are pressed by the spring assembly of the first safety brake unit 1b, 10b against the rotatable braking surface of the elevator driving machinery 1. The torque is tested in the way mentioned above after is engagement of the movable elements 8, 12.

This procedure is then repeated to the rest of the safety brake units 1b, 10b one at a time.

Advantageously the movable elements 8, 12 are engaged with and disengaged from the rotatable braking surface of the elevator driving machinery 1 by adjusting current in the coil assembly 6, 16 of the electromagnets of the safety brake units 1b, 10b.

Another advantageous method to perform the brake test in the elevator mentioned above is as follows:

In one test phase the movable elements 8, 12 of the safety brake units 1b, 10b are kept in the first position in relation to the rotatable braking surface of the elevator driving machinery 1, and the drive motor is used to provide a first test torque, after which the movable elements 8, 12 are moved to the second position in relation to the rotatable braking surface of the elevator driving machinery 1 one after the other, and after each movement the drive motor is used to provide a current test torque.

Preferably, in the first position of the movable elements 8, 12 the safety brake units 1b, 10b are kept engaged to the rotatable braking surface of the elevator driving machinery 1, and in the second position of the movable elements 8, 12 the safety brake units 1b, 10b are kept disengaged from the rotatable braking surface of the elevator driving machinery 1.

Alternatively, in the first position of the movable elements 8, 12 the safety brake units 1b, 10b are kept disengaged from the rotatable braking surface of the elevator driving machinery 1, and in the second position of the movable elements 8, 12 the safety brake units 1b, 10b are kept engaged to the rotatable braking surface of the elevator driving machinery 1.

Preferably, the first position and the second position of the movable elements 8, 12 are controlled by the current in the coil assembly 6, 16 of the safety brake units 1b, 10b.

It is obvious to the person skilled in the art that the invention is not restricted to the examples described above but that it may be varied within the scope of the claims presented below. Thus, for instance the number, structures and components of the safety brake units may differ from what is presented above. For instance, instead of two safety brake units there may be three or four or even more disc brake units or drum brake units in the driving machinery.

It is also obvious to the person skilled in the art that instead of two brake plates in each disc type safety brake unit there may be three or four or even more brake plates in each safety brake unit, or instead of two or three brake armatures in each drum type safety brake unit there may be four or even more brake armatures in each safety brake unit.

It is further obvious to the person skilled in the art that there may be only one magnet core for one or more separate armatures in a safety brake unit according to the invention. Each magnet core may comprise one or more coils, for instance one coil for each brake plate or each armature.

It is still further obvious to the person skilled in the art that the safety brake units, particularly at least two safety brake units according to the invention can be integrated into one brake frame. In that case this kind of structure could be a disc type brake mechanism that is installed in a brake frame at an end of the rotation shaft of the driving machinery. The brake frame of that kind preferably comprises two disc brake units having brake plates. Prior art structures typically comprise a semicircular brake plate in each brake unit, whereas the solution according to the invention comprises preferably two brake plates of a quarter circle in each brake unit, the said two brake plates having a brake magnet in common. In that case the brake entity comprises four brake plates in one brake frame.

The invention claimed is:

1. An elevator safety brake assembly including a plurality of elevator safety brake units that are spaced apart from one another, each elevator safety brake unit comprising:
   a frame part;
   a movable composition comprising a plurality of movable elements, the plurality of movable elements being movably supported on said frame part;
   a compression spring assembly associated with said movable composition, and configured to press each movable element in a first direction to cause the movable elements to be urged to activate a braking; and
   an electromagnet, a coil assembly of which is disposed in the frame part, the electromagnet being configured to, upon an electric current being applied to the coil assembly, apply a force to the movable elements in the movable composition in a second direction opposite to the first direction to cause the movable elements to deactivate the braking,
   wherein, for each elevator safety brake unit, the elevator safety brake assembly is configured to:
   apply a first electric current to the coil assembly to cause at least one first movable element but not all movable elements of the movable composition to move in the second direction, pulled by the electromagnet, to selectively deactivate the braking activated by the at least one first movable element, and
   apply a second electric current, greater than the first electric current, to the coil assembly to cause at least one second movable element of the movable composition, other than the at least one first movable element, to move in the second direction, pulled by the electromagnet, to selectively deactivate the braking activated by the at least one second movable element.

2. The elevator safety brake assembly according to claim 1, wherein said compression spring assembly comprises spring actuators for each of said movable elements, such that the movable elements can move independently of one another, and
   wherein each of said spring actuators comprise at least one compression spring.

3. The elevator safety brake unit according to claim 2, wherein the type of each safety brake unit is one of the following: a shoe brake, a drum brake, a disc brake.

4. The elevator safety brake assembly according to claim 2, wherein the movable elements pressed by the compression springs of each elevator safety brake unit are configured to engage and disengage with different electromagnet currents.

5. The elevator safety brake assembly according to claim 4, wherein the movable elements are arranged to engage and disengage one after the other.

6. The elevator safety brake unit according to claim 4, wherein the type of each safety brake unit is one of the following: a shoe brake, a drum brake, a disc brake.

7. The elevator safety brake assembly according to claim 4, wherein the engagement and disengagement of the movable elements is actuated by gradually changing the current in the coil assembly of the electromagnet in each elevator safety brake unit.

8. The elevator safety brake assembly according to claim 7, wherein the movable elements are arranged to engage and disengage one after the other.

9. The elevator safety brake assembly according to claim 4, wherein the engagement and disengagement of the movable elements are adjusted by spring forces of the compression springs and/or the air gaps between the movable elements and the respective coil assembly.

10. The elevator safety brake assembly according to claim 9, wherein the engagement and disengagement of the movable elements is actuated by gradually changing the current in the coil assembly of the electromagnet in the respective elevator safety brake unit.

11. The elevator safety brake assembly according to claim 9, wherein the movable elements are arranged to engage and disengage one after the other.

12. The elevator safety brake unit according to claim 1, wherein the type of each safety brake unit is one of the following: a shoe brake, a drum brake, a disc brake.

13. The elevator safety brake assembly according to claim 1, wherein the movable elements of each elevator safety brake unit are configured to engage and disengage with different electromagnet currents.

14. An elevator comprising:
    an elevator car movable up and down along guide rails in an elevator shaft by an elevator driving machinery, the elevator driving machinery comprising:
    a drive motor;
    a traction sheave; and
    a brake assembly to stop the rotational motion of the traction sheave,
    wherein the brake assembly comprises a plurality of elevator safety brake units that are operatively associated with the drive motor and are spaced apart from each other, each elevator safety brake unit including:
    a frame part;
    a movable composition comprising a plurality of movable elements, the plurality of movable elements being movably supported on said frame part;
    a compression spring assembly associated with said movable composition, and configured to press each movable element in a first direction to cause the movable elements to be urged to activate a braking; and
    an electromagnet having a coil assembly is disposed in the frame part, the electromagnet being configured to, upon an electric current being applied to the coil assembly, apply a force to the movable elements in the movable composition in a second direction opposite to the first direction to cause the movable elements to deactivate the braking, and
    wherein, for each elevator safety brake unit, the elevator safety brake assembly is configured to:
    apply a first electric current to the coil assembly to cause at least one first movable element but not all movable elements of the movable composition to move in the second direction, pulled by the electromagnet, to selectively deactivate the braking activated by the at least one first movable element, and
    apply a second electric current, greater than the first electric current, to the coil assembly to cause at least one second movable element of the movable composition, other than the at least one first movable element, to move in the second direction, pulled by the electromagnet, to selectively deactivate the braking activated by the at least one second movable element.

15. The elevator according to claim 14, wherein each safety brake unit is arranged to engage and disengage with a brake disc rotated by the drive motor.

16. The elevator according to claim 14, wherein each safety brake is arranged to engage and disengage with a brake drum rotated by the drive motor.

17. A method for testing elevator safety brake units an elevator including:
- an elevator car movable up and down along guide rails in an elevator shaft by an elevator driving machinery, the elevator driving machinery comprising:
  - a drive motor;
  - a traction sheave; and
  - a brake assembly to stop the rotational motion of the traction sheave, the brake assembly including at least two elevator safety brake units of the elevator driving machinery, each safety brake unit comprising N movable elements, where N is an integer greater than one, the method comprising:
- a) actuating less than N, movable elements of a first elevator safety brake unit among the at least two elevator safety brake units and providing, with a drive motor, a test torque to test the actuated movable elements of the first elevator safety brake unit; and
- actuating all movable elements of the other elevator safety brake units while keeping all movable elements of a first elevator safety brake unit open, and providing, with a drive motor, a test torque to test the actuated movable elements of the other elevator safety brake units.

18. The method according to claim 17, comprising:
- at step a), actuating simultaneously all N movable elements of a second elevator safety brake unit among the at least two elevator safety brake units.

19. The method according to claim 17, comprising:
- after step a), repeating the test symmetrically to all the elevator safety brake units.

* * * * *